US011960218B2

(12) United States Patent
Takenaka

(10) Patent No.: US 11,960,218 B2
(45) Date of Patent: Apr. 16, 2024

(54) IMAGE FORMING AND CORRECTION APPARATUS

(71) Applicant: Tomohide Takenaka, Kanagawa (JP)

(72) Inventor: Tomohide Takenaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/047,710

(22) Filed: Oct. 19, 2022

(65) Prior Publication Data

US 2023/0127750 A1 Apr. 27, 2023

(30) Foreign Application Priority Data

Oct. 25, 2021 (JP) ................................ 2021-173825

(51) Int. Cl.
*G03G 15/043* (2006.01)
*G03G 15/00* (2006.01)

(52) U.S. Cl.
CPC ....... *G03G 15/043* (2013.01); *G03G 15/5062* (2013.01); *G03G 2215/00042* (2013.01); *G03G 2215/00067* (2013.01); *G03G 2215/0436* (2013.01); *G03G 2215/047* (2013.01)

(58) Field of Classification Search
CPC ......... G03G 15/043; G03G 2215/0436; G03G 2215/047; G03G 2215/0478; G03G 15/5041; G03G 15/5058; G03G 15/5062; G03G 2215/00029; G03G 2215/00033; G03G 2215/00037; G03G 2215/00042; G03G 2215/00059; G03G 2215/00067
See application file for complete search history.

(56) References Cited

U.S. PATENT DOCUMENTS

| | | | | |
|---|---|---|---|---|
| 2016/0234403 | A1 | 8/2016 | Watanabe et al. | |
| 2017/0038703 | A1 * | 2/2017 | Horiuchi | H04N 1/506 |
| 2017/0339317 | A1 | 11/2017 | Watanabe et al. | |
| 2018/0143581 | A1 | 5/2018 | Nakayama et al. | |
| 2018/0270397 | A1 | 9/2018 | Watanabe | |
| 2019/0064719 | A1 | 2/2019 | Tachi et al. | |
| 2020/0103806 | A1 * | 4/2020 | Akatsu | G03G 15/5041 |

(Continued)

FOREIGN PATENT DOCUMENTS

| | | |
|---|---|---|
| JP | 6-003911 | 1/1994 |
| JP | 2011-164240 | 8/2011 |

(Continued)

*Primary Examiner* — Arlene Heredia
*Assistant Examiner* — Laura Roth
(74) *Attorney, Agent, or Firm* — IPUSA, PLLC

(57) ABSTRACT

The present invention pertains to an image forming apparatus that includes a latent image bearer, an exposure device, a detector, and processing circuitry. The exposure device exposes the latent image bearer to form a latent image based on image data. The detector detects density unevenness, in a main scanning direction, of a toner image obtained by developing the latent image. The processing circuitry corrects only an exposure amount of the exposure device based on the density unevenness to form an image portion with a higher gradation than a prescribed gradation, the processing circuitry further configured to correct the exposure amount and the image data based on the density unevenness in the main scanning direction detected by the detector to form an image portion with a gradation equal to or lower than the prescribed gradation.

5 Claims, 16 Drawing Sheets

(56) References Cited

U.S. PATENT DOCUMENTS

| | | | | |
|---|---|---|---|---|
| 2021/0318651 A1* | 10/2021 | Tachi | ................. | G03G 15/5062 |
| 2023/0280672 A1* | 9/2023 | Oya | ........................ | H04N 1/405 |
| | | | | 399/51 |

FOREIGN PATENT DOCUMENTS

| | | |
|---|---|---|
| JP | 2014-170195 | 9/2014 |
| JP | 2016-147481 | 8/2016 |
| JP | 2017-116592 | 6/2017 |
| JP | 2017-200728 | 11/2017 |
| JP | 2017-208811 | 11/2017 |
| JP | 2018-154060 | 10/2018 |
| JP | 2019-061163 | 4/2019 |

* cited by examiner

FIG. 15

| POSITION IN MAIN SCANNING DIRECTION | GRADATION NUMBER | | | | | | | | | | | | |
|---|---|---|---|---|---|---|---|---|---|---|---|---|---|
| | 1 | 2 | 3 | 4 | 5 | 6 | .... | 225 | 226 | 227 | 228 | 229 | 230 |
| 0 | 1 | 2 | 2 | 3 | 4 | 4 | | 225 | 226 | 227 | 228 | 229 | 230 |
| 1 | 1 | 2 | 3 | 4 | 5 | 5 | | 223 | 224 | 225 | 226 | 227 | 228 |
| 2 | 1 | 2 | 3 | 4 | 5 | 6 | | 220 | 221 | 222 | 223 | 223 | 224 |
| 3 | 1 | 2 | 3 | 4 | 5 | 6 | | 219 | 220 | 221 | 222 | 223 | 224 |
| 4 | 1 | 2 | 3 | 4 | 5 | 6 | | 219 | 220 | 221 | 222 | 223 | 224 |
| 5 | 2 | 3 | 4 | 5 | 6 | 7 | | 219 | 220 | 221 | 222 | 222 | 223 |
| 6 | 2 | 3 | 4 | 5 | 6 | 7 | | 219 | 220 | 220 | 221 | 222 | 223 |
| .... | | | | | | | | | | | | | |
| X-6 | 2 | 3 | 5 | 6 | 7 | 8 | | 225 | 226 | 227 | 228 | 229 | 230 |
| X-5 | 2 | 3 | 4 | 5 | 6 | 7 | | 225 | 226 | 227 | 228 | 229 | 230 |
| X-4 | 2 | 3 | 4 | 5 | 6 | 7 | | 227 | 228 | 229 | 230 | 230 | 231 |
| X-3 | 1 | 2 | 3 | 4 | 5 | 6 | | 228 | 229 | 230 | 231 | 232 | 232 |
| X-2 | 1 | 2 | 3 | 4 | 5 | 6 | | 229 | 230 | 231 | 232 | 233 | 233 |
| X-1 | 1 | 2 | 3 | 4 | 5 | 6 | | 229 | 230 | 231 | 232 | 233 | 234 |
| X | 1 | 2 | 3 | 4 | 5 | 5 | | 230 | 231 | 232 | 233 | 234 | 235 |

IMAGE FORMING AND CORRECTION APPARATUS

CROSS-REFERENCE TO RELATED APPLICATION

This patent application is based on and claims priority pursuant to 35 U.S.C. § 119(a) to Japanese Patent Application No. 2021-173825, filed on Oct. 25, 2021, in the Japan Patent Office, the entire disclosure of which is hereby incorporated by reference herein.

BACKGROUND

Technical Field

Embodiments of the present disclosure relate to an image forming apparatus.

Discussion of the Background Art

An image forming apparatus is known that includes a latent image bearer, an exposure device to expose the latent image bearer to form a latent image based on image data, and a detector to detect density unevenness, in a main scanning direction, of a toner image obtained by developing the latent image, in which an exposure amount of the exposure device is corrected based on the density unevenness in the main scanning direction detected by the detector.

As such an image forming apparatus as described above, for example, an image forming apparatus has been proposed that uses, as the toner image in which density unevenness in the main scanning direction is detected by a color sensor as the detector, a band-shaped test pattern elongated in the main scanning direction with an image density of 100%.

SUMMARY

In an embodiment of the present disclosure, an image forming apparatus includes a latent image bearer, an exposure device, a detector, and processing circuitry. The exposure device exposes the latent image bearer to form a latent image based on image data. The detector detects density unevenness, in a main scanning direction, of a toner image obtained by developing the latent image. The processing circuitry corrects an exposure amount of the exposure device and the image data based on the density unevenness in the main scanning direction detected by the detector.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 15 illustrates an example of a gradation correction table; and

Figure 1:
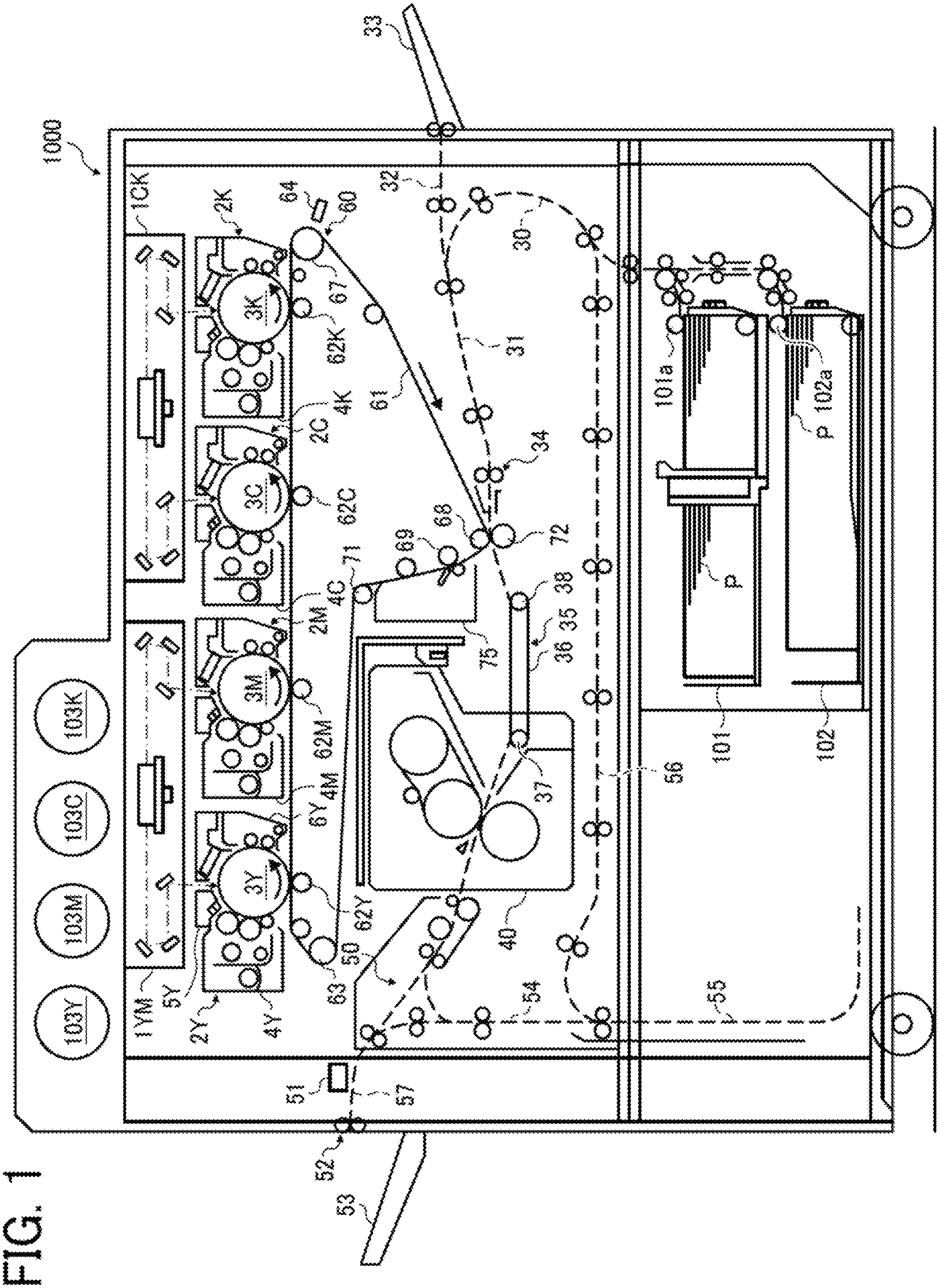
FIG. 1 is a schematic configuration diagram illustrating an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an embodiment of a printer that forms an image by an electrophotographic scheme will be described as an image forming apparatus to which the present disclosure is applied. At first, a description is given of a basic configuration of an image forming apparatus 1000 according to an embodiment of this disclosure, with reference to FIG. 1.

FIG. 1 is a schematic configuration diagram illustrating the image forming apparatus 1000 according to the embodiment. The image forming apparatus 1000 includes four process units 2Y, 2M, 2C, and 2K for forming toner images of yellow (Y), magenta (M), cyan (C), and black (K). The image forming apparatus 1000 also includes a sheet feed passage 30, a pre-transfer sheet conveyance passage 31, a bypass sheet feed passage 32, a bypass feeder 33, a pair of registration rollers 34, and a conveyance belt unit 35. The image forming apparatus 1000 also includes a fixing device 40, a conveyance direction switching device 50, a pair of sheet ejection rollers 52, a sheet ejection tray 53, a first sheet container 101, a second sheet container 102, a re-entry device, and the like. The image forming apparatus 1000 also includes two optical writing units 1YM and 1CK. The process units 2Y, 2M, 2C, and 2K include drum-shaped photoconductors 3Y, 3M, 3C, and 3K as latent image bearers.

The first sheet container 101 and the second sheet container 102 each accommodate a bundle of recording sheets P in the inside. The first sheet container 101 includes a sheet feed roller 101*a* and the second sheet container 102 includes a sheet feed roller 102*a*. An uppermost recording sheet P that is placed on top of the bundle of recording sheets P is fed by rotation of a selected one of the sheet feed rollers 101*a* and 102*a* toward the sheet feed passage 30. The sheet feed passage 30 is followed by the pre-transfer sheet conveyance passage 31 for conveying the recording sheet P immediately before a secondary transfer nip region described later. The recording sheet P as a recording member fed from the sheet container 101 or 102 enters the pre-transfer sheet conveyance passage 31 via the sheet feed passage 30.

The bypass feeder 33 is disposed on a side surface of a housing of the image forming apparatus 1000 so as to be openable and closable relative to the housing, and a sheet bundle is manually fed onto an upper surface of the tray in a state of being opened relative to the housing. The uppermost recording sheet P placed on top of the bundle of recording sheets P is fed toward the pre-transfer sheet conveyance passage 31 by a feeding roller of the bypass feeder 33.

The two optical writing units 1YM and 1CK as an exposure device that exposes the surfaces of the photoconductors to form electrostatic latent images on the surfaces of the photoconductors each include a laser diode, a polygon mirror, various lenses, and the like. Each of the optical writing units 1YM and 1CK drives the laser diode as a light source based on image data read by a scanner outside the image forming apparatus 1000 or image data sent from a personal computer. Then, the optical writing units 1YM and 1CK optically scan the photoconductors 3Y, 3M, 3C, and 3K of the process units 2Y, 2M, 2C, and 2K. Specifically, the photoconductors 3Y, 3M, 3C, and 3K of the process units 2Y, 2M, 2C, and 2K are rotated in the counterclockwise direction in the drawing by a driving device. The optical writing unit 1YM performs the optical scanning process by irradiating the driven photoconductors 3Y and 3M with laser light while deflecting the laser light in a rotation axis direction. As a result, electrostatic latent images based on Y and M image data are formed on the photoconductors 3Y and 3M. The optical writing unit 1CK performs the optical scanning process by irradiating the driven photoconductors 3C and 3K with laser light while deflecting the laser light in a rotation axis direction. As a result, electrostatic latent images based on C and K image data are formed on the photoconductors 3C and 3K.

The process units 2Y, 2M, 2C, and 2K are each one unit supported in a common support. The one unit includes the photoconductor as a latent image bearer and various equipment disposed around the photoconductor. The process units 2Y, 2M, 2C, and 2K are detachable from a main body of the image forming apparatus 1000. The configurations are similar except that the colors of the used toners are different from each other. For example, the process unit 2Y for Y includes the photoconductor 3Y, and a developing device 4Y for developing an electrostatic latent image formed on the surface of the photoconductor 3Y into a Y toner image. The process unit 2Y also includes a charging device 5Y that performs a process of uniformly charging the surface of the rotated photoconductor 3Y, a drum cleaning device 6Y that cleans transfer residual toner adhering to the surface of the photoconductor 3Y after the photoconductor 3Y passes through a primary transfer nip for Y described later, and the like.

The present image forming apparatus 1000 has what is called a tandem configuration in which the four process units 2Y, 2M, 2C, and 2K are arranged along an intermediate transfer belt 61, which will be described later, in the endless-belt movement direction of the intermediate transfer belt 61.

The photoconductor 3 (i.e., the photoconductor 3Y, 3M, 3C, or 3K) is manufactured with a hollow tube made of aluminum, for example, with the front face covered by an organic photoconductive layer having photosensitivity. Note that the photoconductor 3 may have a shape of an endless belt type.

The developing device 4 (i.e., a developing device 4Y, 4M, 4C, or 4K) develops a latent image with a two-component developer including magnetic carrier particles and non-magnetic toner. Hereinafter, the two-component developer is simply referred to as a "developer". A toner supplier appropriately replenishes the corresponding developing device 4 with corresponding color toner in a toner bottle 103 (i.e., a toner bottle 103Y, 103M, 103C, or 103K). A toner density detector is provided in the developing device 4. The toner density detector detects a magnetic permeability caused by the carrier that is a magnetic material, and computes the density of the toner from the amount of the carrier contained in a certain volume. The toner density in the developing device is detected by the toner density detector, and the toner density in the developing device is controlled within a certain range (for example, 5 wt % to 9 wt %).

As the drum cleaning device 6, a scheme is used in which a cleaning blade made of polyurethane rubber is pressed against the photoconductor 3, but another scheme may be used. In order to improve the cleaning performance, the present image forming apparatus 1000 employs a scheme in which a rotatable fur brush is brought into contact with the photoconductor 3. This fur brush scrapes a solid lubricant into powder and applies the lubricant powder to the surface of the photoconductor 3.

An electric discharging lamp is disposed above the photoconductor 3. The electric discharging lamp is also included in the process unit 2. Further, the electric discharging lamp optically emits light to the photoconductor 3 to remove electricity from the surface of the photoconductor 3 after the photoconductor 3 passes through the drum cleaning device 6. The surface of the photoconductor 3 from which electricity has been removed is uniformly charged by the charging device 5, and then subjected to optical scanning by the above-described optical writing unit 1YM or 1CK. It is to be noted that the charging device 5 rotates while receiving the charging bias from a power supply. Instead of this scheme, the charging device 5 can employ a scorotron charging scheme in which a charging process is performed without contacting the photoconductor 3.

A transfer unit 60 is disposed under the four process units 2Y, 2M, 2C, and 2K. The transfer unit 60 makes the intermediate transfer belt 61, which is an image bearer and is stretched by a plurality of rollers, make an endless-belt movement in the clockwise direction in the drawing by rotation of any one of the rollers while making the intermediate transfer belt 61 be in contact with the photoconductors 3Y, 3M, 3C, and 3K. As a result, primary transfer nips for Y, M, C, and K are formed in which the photoconductors 3Y, 3M, 3C, and 3K are in contact with the intermediate transfer belt 61.

In the vicinity of the primary transfer nips for Y, M, C, and K, primary transfer rollers 62Y, 62M, 62C, and 62K disposed inside the belt loop press the intermediate transfer belt 61 toward the photoconductors 3Y, 3M, 3C, and 3K. A primary transfer bias is applied by respective transfer bias power supplies to the primary transfer rollers 62Y, 62M, 62C, and 62K. As a result, primary transfer electric fields are formed at the primary transfer nips for Y, M, C, and K to electrostatically move toner images on the photoconductors 3Y, 3M, and 3K toward the intermediate transfer belt 61.

At each primary transfer nip, the toner image is sequentially superimposed on a front surface of the intermediate transfer belt 61 that sequentially passes through the primary transfer nips for Y, M, C, and K with the endless-belt movement in the clockwise direction in the drawing, and thus a primary transfer is performed. By the primary transfer of the superimposition, a four-color superimposed toner image (hereinafter referred to as a four-color toner image) is formed on the front surface of the intermediate transfer belt 61.

A secondary transfer roller 72 is disposed under the intermediate transfer belt 61 in the drawing. The secondary transfer roller 72 is in contact with the front surface of the intermediate transfer belt 61 at a position where the intermediate transfer belt 61 is hung around a secondary transfer backup roller 68 to form a secondary transfer nip region. As a result, the secondary transfer nip region is formed in which the front surface of the intermediate transfer belt 61 and the secondary transfer roller 72 are in contact with each other.

A secondary transfer bias is applied by a transfer bias power supply to the secondary transfer roller 72. On the other hand, the secondary transfer backup roller 68 in the belt loop is grounded. By so doing, a secondary transfer electric field is formed in the secondary transfer nip region.

The pair of registration rollers 34 is disposed on the right side of the secondary transfer nip region in FIG. 1. The pair of registration rollers 34 holds and feeds a recording sheet P to the secondary transfer nip region in synchronization with arrival of a four-color toner image formed on the intermediate transfer belt 61 so as to further feed the recording sheet P toward the secondary transfer nip region. In the secondary transfer nip region, a collective secondary transfer of the four-color toner image on the intermediate transfer belt 61 to the recording sheet P is performed due to the influences of the secondary transfer electric field and a nip pressure, and the transferred four-color toner image together with the white color of the recording sheet P forms a full-color image.

A toner adhesion amount detection sensor 64, which is a reflective optical sensor, is disposed between the primary transfer nip K and the secondary transfer nip region. The reflective optical sensor includes a light emitting element and a light receiving element. Light emitted from the light emitting element is reflected by a toner patch on the intermediate transfer belt 61, received by the light receiving element, and converted into a signal. The change in the signal is read to analogize the information about test patterns, and the adhesion amount of the toner patch is detected.

Transfer residual toner that has not been transferred to the recording sheet P at the secondary transfer nip region adheres to the front surface of the intermediate transfer belt 61 that has passed through the secondary transfer nip region. The transfer residual toner is cleaned by a belt cleaning device 75 that is in contact with the intermediate transfer belt 61.

The recording sheet P that has passed through the secondary transfer nip region separates from the intermediate transfer belt 61 to be conveyed to the conveyance belt unit 35. The conveyance belt unit 35 makes a conveyance belt 36, which has a shape like an endless belt, make an endless-belt movement in the counterclockwise direction in the drawing by rotation of a driving roller 37 while the conveyance belt 36 is stretched by the driving roller 37 and a driven roller 38. The conveyance belt unit 35 conveys the recording sheet P delivered from the secondary transfer nip region, to the fixing device 40 with an endless-belt movement of the belt while the recording sheet P is held on an upper stretched belt surface.

The recording sheet P that has passed through the secondary transfer nip region described above is sent into the fixing device 40 and sandwiched by a fixing nip. Then, the recording sheet P is subjected to a process of fixing the toner image by effects, such as pressure application and heating.

The recording sheet P having, on the first face, the toner image transferred at the secondary transfer nip region and fixed by the fixing device 40 is fed toward the conveyance direction switching device 50.

In the present image forming apparatus 1000, the conveyance direction switching device 50, a re-entry passage 54, a switchback passage 55, a post-switchback conveyance passage 56, and the like constitute a re-entry device. Specifically, after receiving the recording sheet P from the fixing device 40, the conveyance direction switching device 50 switches a direction of conveyance of the recording sheet P, in other words, a direction in which the recording sheet P is further conveyed, between a sheet ejection passage 57 and the re-entry passage 54. Specifically, when a single-sided mode print job for forming an image only on the first face of the recording sheet P is executed, the conveyance direction is set to the sheet ejection passage 57. As a result, the recording sheet P having an image only on the first face is sent to the pair of sheet ejection rollers 52 via the sheet ejection passage 57, and is ejected onto the sheet ejection tray 53 outside the image forming apparatus 1000. When a double-sided mode print job for forming images on both the first and second faces of the recording sheet P is executed, and the recording sheet P having the images fixed to both the first and second faces is received from the fixing device 40, the conveyance direction is set to the sheet ejection passage 57. According to the setting, the recording sheet P having images on both the first and second faces is conveyed and ejected to the sheet ejection tray 53 outside the image forming apparatus 1000. On the other hand, when a double-sided mode print job is executed, and a recording sheet P having an image fixed only to the first face is received from the fixing device 40, the conveyance direction is set to the re-entry passage 54.

The re-entry passage 54 is connected to the switchback passage 55. The recording sheet P sent to the re-entry passage 54 enters the switchback passage 55. Consequently, when the entire region, in the sheet conveying direction, of the recording sheet P enters the switchback passage 55, the direction of conveyance of the recording sheet P is reversed, so that the recording sheet P is switched back in the reverse direction. The switchback passage 55 is also connected to the post-switchback conveyance passage 56 in addition to the re-entry passage 54, and the switchback recording sheet P enters the post-switchback conveyance passage 56. At this time, the faces of the recording sheet P are reversed. Then, the recording sheet P the faces of which have been reversed is made to re-enter the secondary transfer nip region via the post-switchback conveyance passage 56 and the above-described sheet feed passage 30. For the recording sheet P having a toner image also transferred to the second face at the secondary transfer nip region, the toner image is fixed to the second face via the fixing device 40, and then the recording sheet P is ejected onto the sheet ejection tray 53 via the conveyance direction switching device 50 and the pair of sheet ejection rollers 52. A density sensor 51 as a detector that detects the image density on the recording sheet P is disposed in front of the pair of sheet ejection rollers 52, and detects the image density on the recording sheet P at the time of an adjustment operation to be described later.

A configuration of the density sensor 51 will be described.

Figure 2:
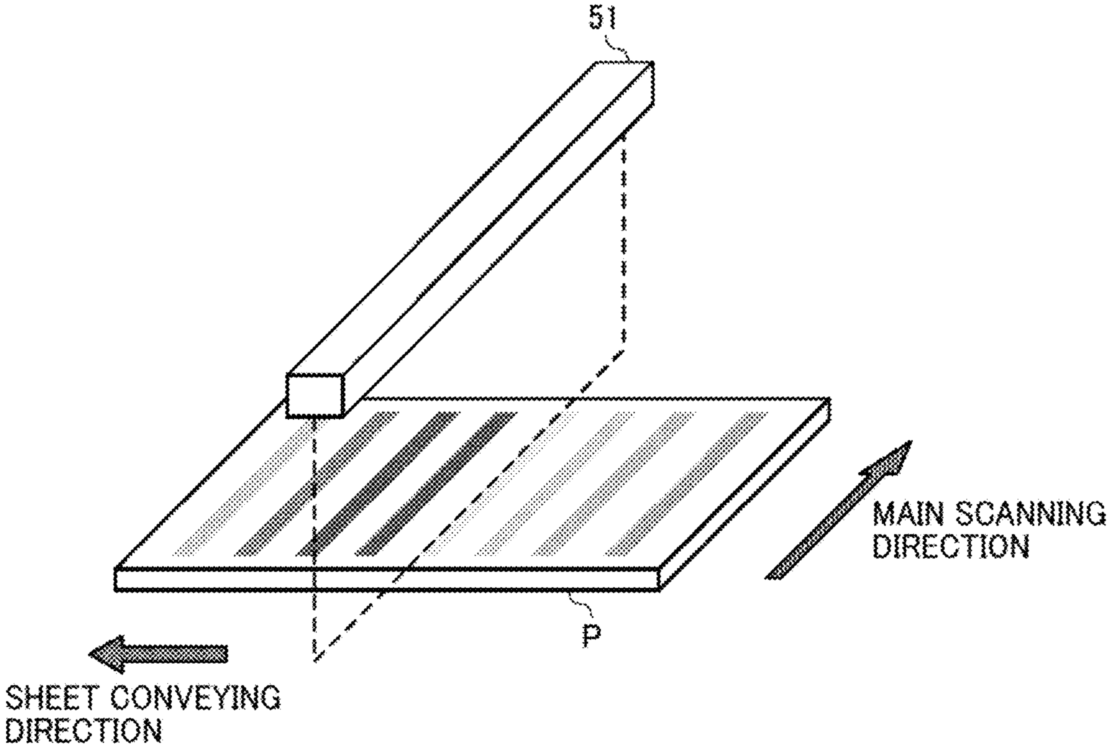
FIG. 2 is a perspective view of a density sensor.

FIG. 2 is a perspective view of the density sensor 51. The density sensor 51 has a shape elongated in the main scanning direction. The density sensor 51 contains an image element having a shape elongated in the main scanning direction. The density sensor 51 may be referred to as a line sensor. The detection width of the density sensor 51 in the main scanning direction is a width indicated by a dotted line in the main scanning direction in FIG. 2. Since this detection width is longer than the width of the recording sheet P in the main scanning direction, when the recording sheet P is conveyed so as to pass through the width indicated by the dotted line in the main scanning direction, it is possible to detect the image density over the entire region on the recording sheet P.

Figure 3:
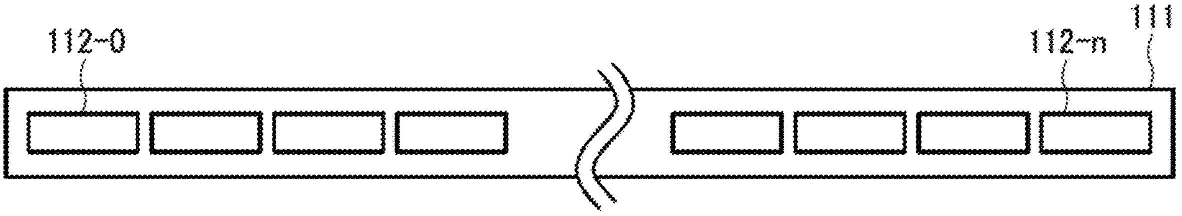
FIG. 3 is a schematic configuration diagram of an image element included in the density sensor.

FIG. 3 is a schematic configuration diagram of an image element 111 included by the density sensor 51.

As illustrated in FIG. 3, the image element 111 has a shape extending in the main scanning direction, and small light receiving elements 112-0 to **112-*n* (hereinafter referred to as light receiving elements 112 in a case where the light receiving elements 112 do not need to be distinguished from each other) are arranged to align in the main scanning direction. The extent in which the light receiving elements 112 align is the above-described detection width of the density sensor 51** in the main scanning direction.

Figure 4:
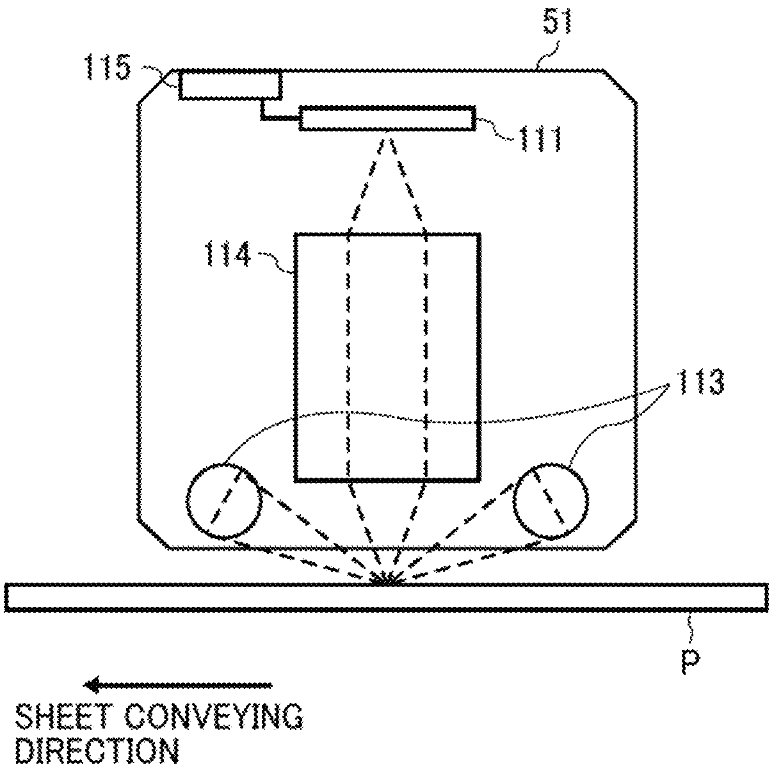
FIG. 4 is a cross-sectional view of the density sensor perpendicular to a main scanning direction.

FIG. 4 is a cross-sectional view of the density sensor 51 perpendicular to the main scanning direction.

As illustrated in FIG. 4, the density sensor 51 includes a light source 113, a lens array 114, and an output circuit 115, in addition to the image element 111 described above. A broken line represents light emitted from the light source 113.

As the light source 113, a light source in which a light emitting element is provided at an end portion of a light guide body, an LED array, or the like can be used. The light source 113 emits RGB light. As the lens array 114, for example, a SELFOC (registered trademark) lens is used.

The light emitted from the light source 113 is reflected on the recording sheet P, and an image of the light is formed by the lens array 114. In the image element 111, each light receiving element 112 illustrated in FIG. 3 receives the image of the light formed by the lens array 114, and outputs a signal corresponding to the received light.

A complementary metal oxide semiconductor (CMOS) sensor or a charge-coupled device (CCD) sensor, for example, may be used as the image element 111.

As the output circuit 115, an application-specific integrated circuit (ASIC), for example, is used. Based on a signal from each light receiving element 112 on the image element 111, the output circuit 115 converts the signal into data indicating image density corresponding to a main-scanning direction position of the toner pattern on the recording sheet P, and outputs the data. For example, gradations 0 to 255 represented by 8 bits are output. A state without an image is a gradation 0, and a solid image is a gradation 255.

In the electrophotographic image forming apparatus according to the present embodiment, an image is formed on a recording sheet P through a plurality of steps, such as a development step, a transfer step, and a fixing step. The development step is a step in which the photoconductors 3 are uniformly charged, latent images are formed by performing optical scanning with the optical writing units 1, and toner supplied from the developing devices 4 adheres to the latent images to develop the latent images. The transfer step includes a first transfer step of transferring the toner images on the photoconductors 3 to the intermediate transfer belt 61, and a second transfer step of transferring the toner image from the intermediate transfer belt 61 to a recording sheet P. The fixing process is a step of fixing the toner image on the recording sheet P to the recording sheet P with the fixing device 40.

In each of these steps, a charging deviation of the photoconductor, a deviation of the gap between the photoconductor and a developing roller of the developing device, a transfer pressure deviation, and the like occur in the main scanning direction due to a mechanical precision variation, characteristic variations of the supplies, and the like relative to the main scanning direction that is an axial direction of the photoconductor. These deviations cause image density fluctuations (hereinafter referred to as density unevenness) in the main scanning direction.

Figure 5A:
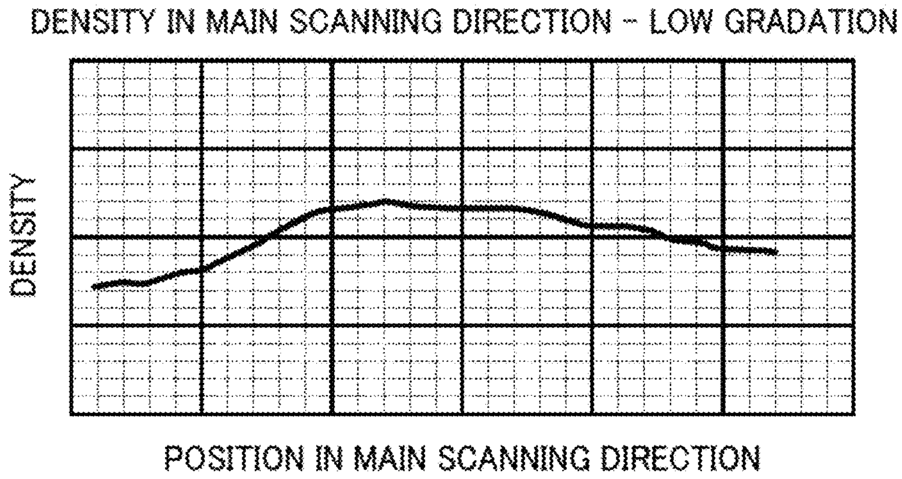
FIG. 5A illustrates an example of image density unevenness of a low-gradation image in the main scanning direction.
Figure 5B:
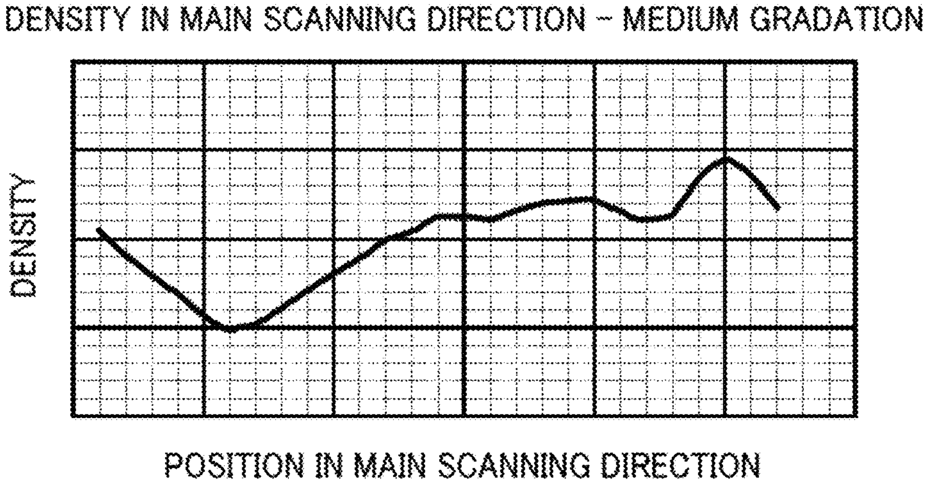
FIG. 5B illustrates an example of image density unevenness of a medium-gradation image in the main scanning direction.
Figure 5C:
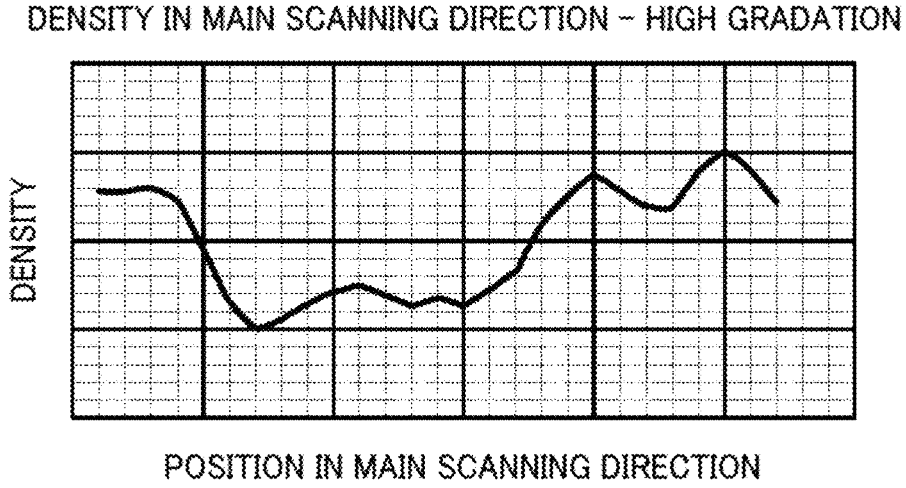
FIG. 5C illustrates an example of image density unevenness of a high-gradation image in the main scanning direction.

FIG. 5A illustrates the image density unevenness of a low-gradation image in the main scanning direction. FIG. 5B illustrates the image density unevenness of a medium-gradation image in the main scanning direction. FIG. 5C illustrates the image density unevenness of a high-gradation image in the main scanning direction. The horizontal axis represents main-scanning direction position, and the vertical axis represents density.

Since as described above, the density unevenness in the main scanning direction is caused by a combination of several factors, as illustrated in FIGS. 5A to 5C, the tendencies of the density unevenness may be different from each other among the low to high gradations.

Figure 6:
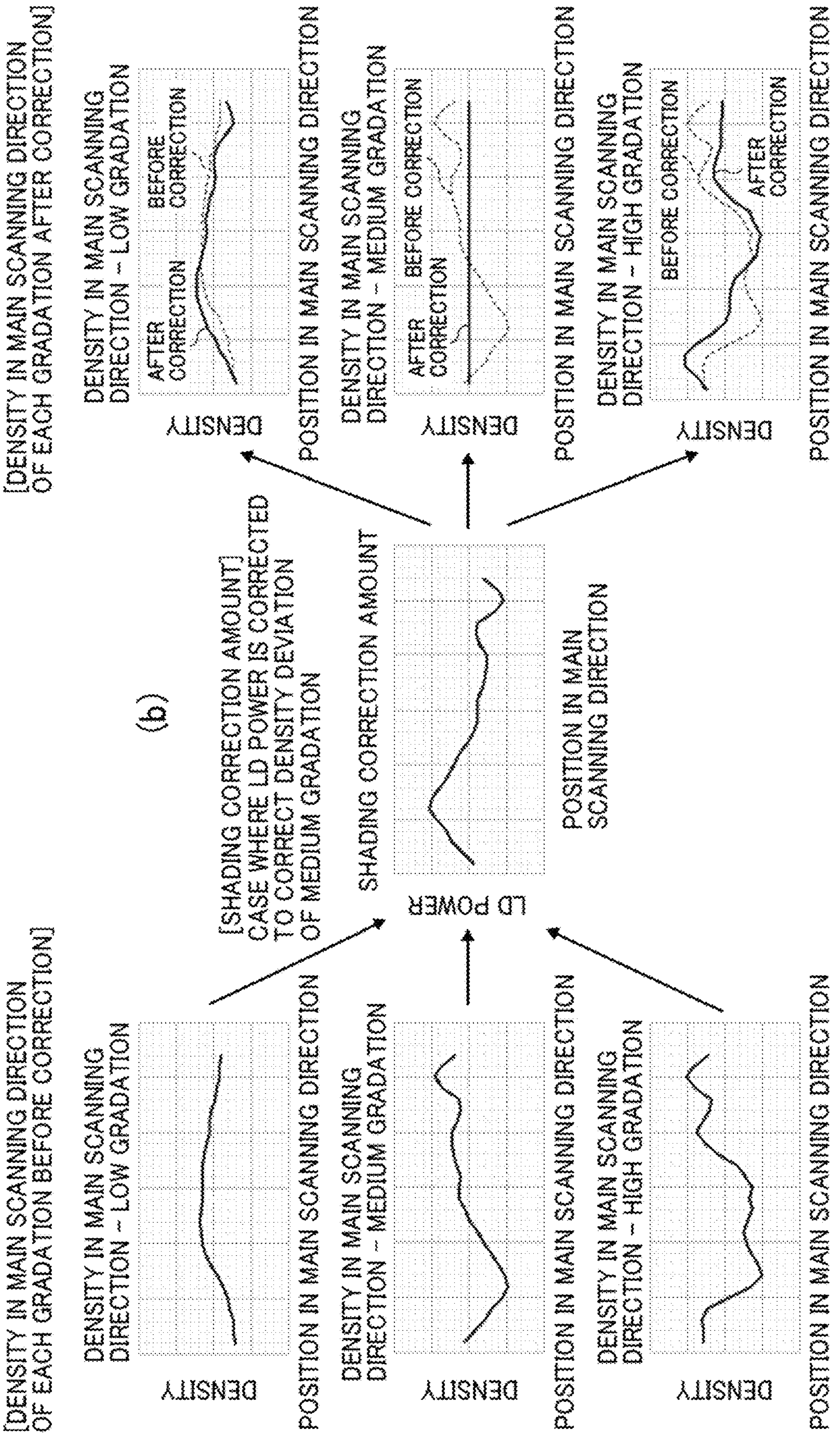
FIG. 6 illustrates graphs of a comparative example of correction to density unevenness in the main scanning direction.

Parts (a), (b), and (c) of FIG. 6 are graphs of correction to density unevenness in the main scanning direction.

The density unevenness of a medium gradation in the main scanning direction is conventionally acquired by forming, on a recording sheet P, a medium-gradation band-shaped test pattern elongated in the main scanning direction, and detecting the test pattern on the recording sheet P with the density sensor 51. Then, as illustrated in part (b) of FIG. 6, based on the acquired medium-gradation density unevenness in the main scanning direction, computed is a shading correction amount for correcting the light amount (laser diode (LD) power), which is an exposure amount, of the laser light of the optical writing units 1YM and 1CK.

In the computation of the shading correction amount, a predetermined area in the main scanning direction is used as a reference area, a difference between the density of the reference area and the image density of each area in the main scanning direction except the reference area is computed, and the shading correction amount is computed so as to get rid of the difference. Alternatively, the average image density in the main scanning direction may be used as a reference, a difference between the average image density and the image density of each area in the main scanning direction may be computed, and a shading correction amount may be computed so as to get rid of the difference. As a result of the shading correction, the medium-gradation density unevenness in the main scanning direction can be eliminated as illustrated in part (c) of FIG. 6. However, for a low-gradation image and a high-gradation image, latent images are also conventionally formed with the laser light amount subjected to the shading correction. Therefore, in a case where the tendencies of the density unevenness are different from each other among the low gradation, the medium gradation, and the high gradation, the density unevenness in the main scanning direction cannot be sufficiently improved for the low gradation and the high gradation, as illustrated in part (c) of FIG. 6.

It is also conceivable to compute a shading correction amount corresponding to the low gradation, a shading correction amount corresponding to the medium gradation, and a shading correction amount corresponding to the high gradation, and change, according to the gradation of an image to be printed, a shading correction amount to be applied. However, in a case of printing an image in which a high-gradation image portion and a low-gradation image portion exist together, it is difficult to perform control to change, according to the gradation of an image portion to be printed, a shading correction amount to be applied, during the printing operation.

As a technique for reducing density unevenness in the main scanning direction, there is a technique for correcting the gradation of image data.

The image forming apparatus 1000 expresses an image with a group of small dots, and expresses gradations 0 to 255 represented by 8 bits, with image shading expressed by the density of color dots. An image processing unit 204 (see FIG. 9) of the image forming apparatus 1000 converts image data read by a scanner or image data sent from a personal computer, into a pseudo-gradation image binarized by a predetermined method, such as dithering, a density pattern method, or an error diffusion method. Then, based on the pseudo-gradation image, the laser diode of the optical writing unit 1 is controlled on and off to form an electrostatic latent image. The gradation correction to image data corrects the gradation (density of color dots) of the converted pseudo-gradation image.

Figure 7:
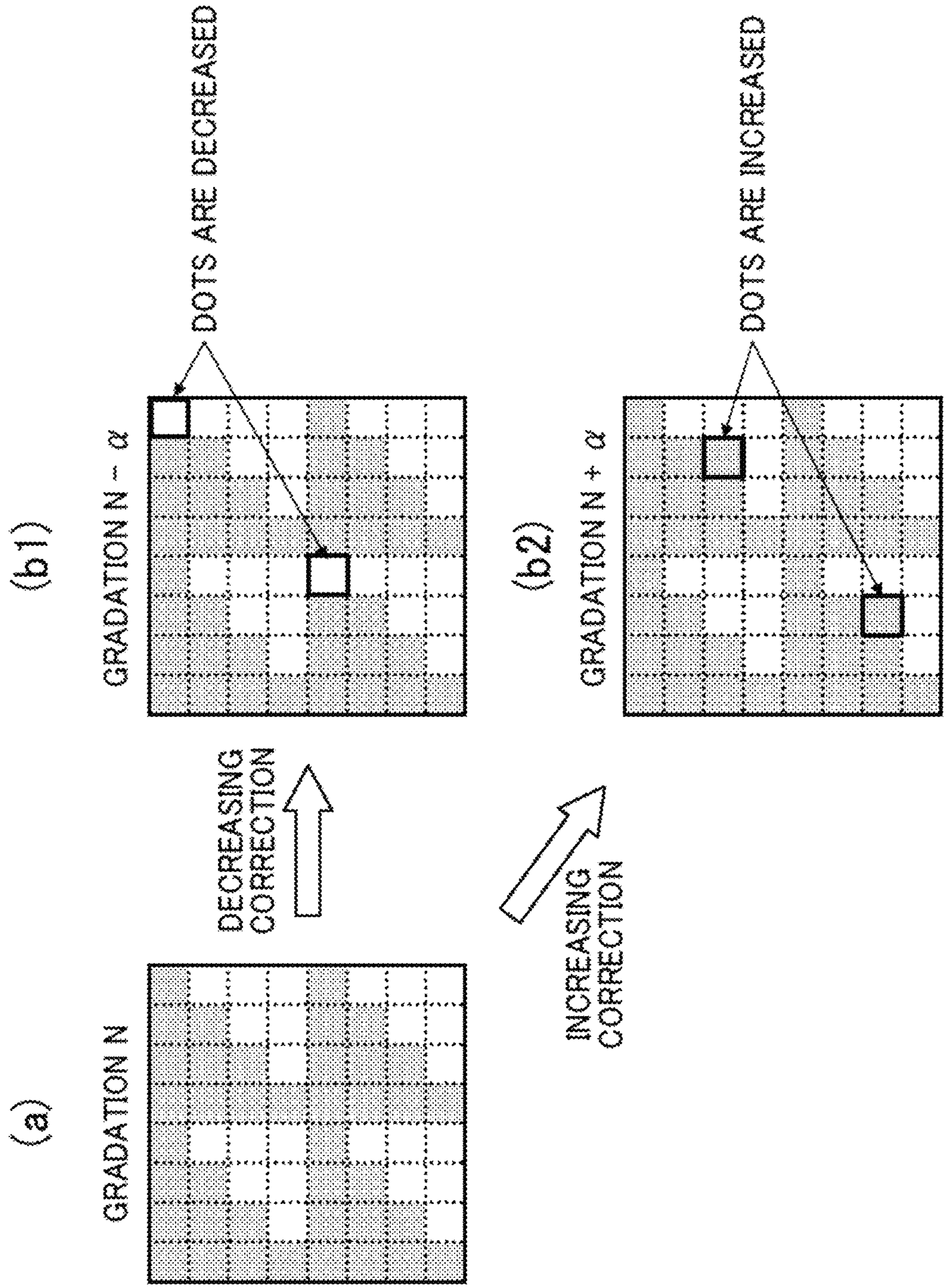
FIG. 7 is a diagram illustrating examples of a gradation correction.

FIG. 7 is a diagram illustrating examples of a gradation correction as a density correction by a correction to image data.

Part (a) of FIG. 7 illustrates a gradation-N pseudo-gradation image (dot pattern). To decrease the image density, as illustrated in part (b1) of FIG. 7, a gradation correction is performed to change some color dots into white dots by a predetermined algorithm to decrease the number of color dots to decrease the gradation. On the other hand, to increase the image density, as illustrated in part (b2) of FIG. 7, a gradation correction is performed to change some white dots into color dots by a predetermined algorithm to increase the number of color dots to increase the gradation.

Figure 8A:
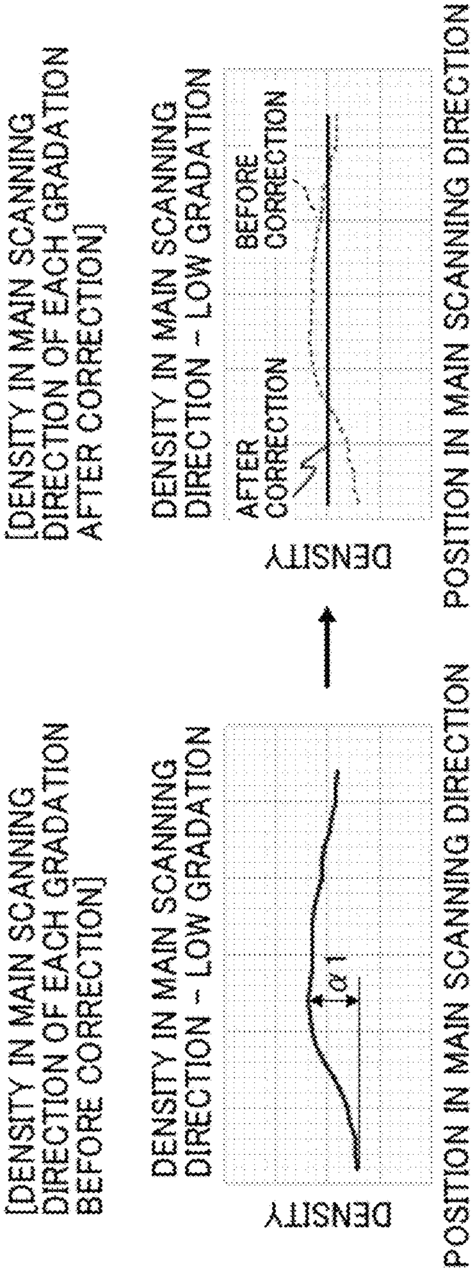
FIG. 8A is a diagram illustrating density unevenness in the main scanning direction after a gradation correction to a low gradation.
Figure 8B:
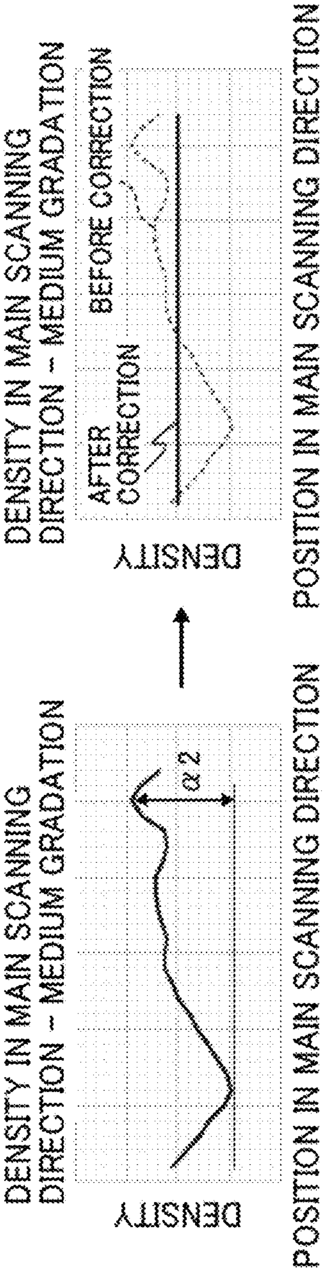
FIG. 8B is a diagram illustrating density unevenness in the main scanning direction after a gradation correction to a medium gradation.
Figure 8C:
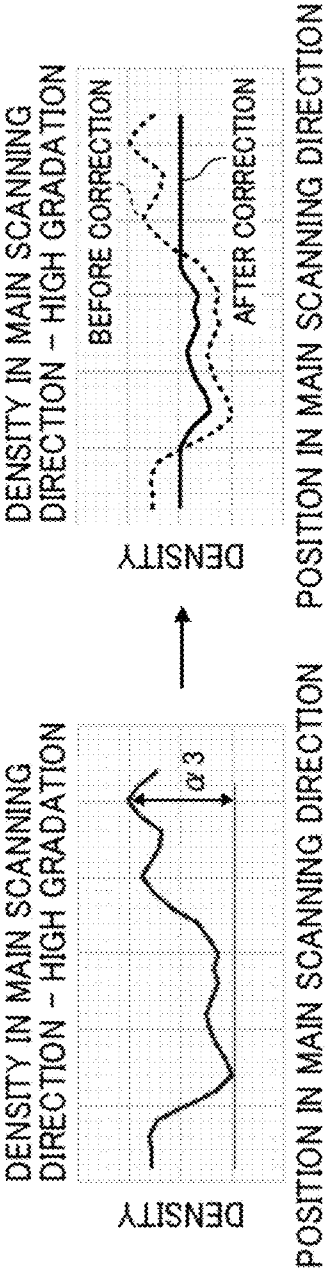
FIG. 8C is a diagram illustrating density unevenness in the main scanning direction after a gradation correction to a high gradation.

FIG. 8A includes graphs illustrating the density unevenness in the main scanning direction after a gradation correction to a low gradation. FIG. 8B includes graphs illustrating the density unevenness in the main scanning direction after a gradation correction to a medium gradation. FIG. 8C includes graphs illustrating the density unevenness in the main scanning direction after a gradation correction to a high gradation.

As can be seen from FIGS. 8A to 8C, for the low gradation and the medium gradation, the gradation correction as a correction to image data can eliminate the density unevenness in the main scanning direction. However, for the high gradation, as illustrated in FIG. 8C, the gradation correction cannot obtain the reference density at a portion where the image density is low, and cannot sufficiently improve the density unevenness in the main scanning direction. In a case of such a gradation correction as illustrated in FIGS. 7A, 7B1, and 7B2, the higher the gradation, the smaller the number of white dots, and the smaller the number of dots that can be converted into color dots. Therefore, the higher the gradation, the narrower correction room in the (higher-gradation) direction in which the image density is increased. As a result, for the portion where the image density is low, the correction does not obtain the reference density, and for the high gradation, the gradation correction cannot sufficiently improve the density unevenness in the main scanning direction.

On the other hand, in the low gradation, the number of color dots is small, the number of dots that can be converted into white dots is small, and the lower the gradation, the narrower correction room in the (lower-gradation) direction in which the image density is decreased. However, since in a case of the low gradation, the amount of attaching toner is small, a density variation range $\alpha 1$ in the main scanning direction (the difference between the maximum density and the minimum density) is narrower than a medium-gradation variation range $\alpha 2$ and a high-gradation variation range $\alpha 3$. Therefore, even if for the low gradation, the correction room in the direction in which the image density is decreased is narrow, a gradation correction can eliminate the density unevenness in the main scanning direction.

As described above, only the shading correction or only the gradation correction cannot favorably reduce the density unevenness in the main scanning direction for all the gradations. Therefore, in the present embodiment, a combination of the shading correction and the gradation correction favorably reduces the density unevenness in the main scanning direction for all the gradations. Hereinafter, features of the present disclosure will be described.

Figure 9:
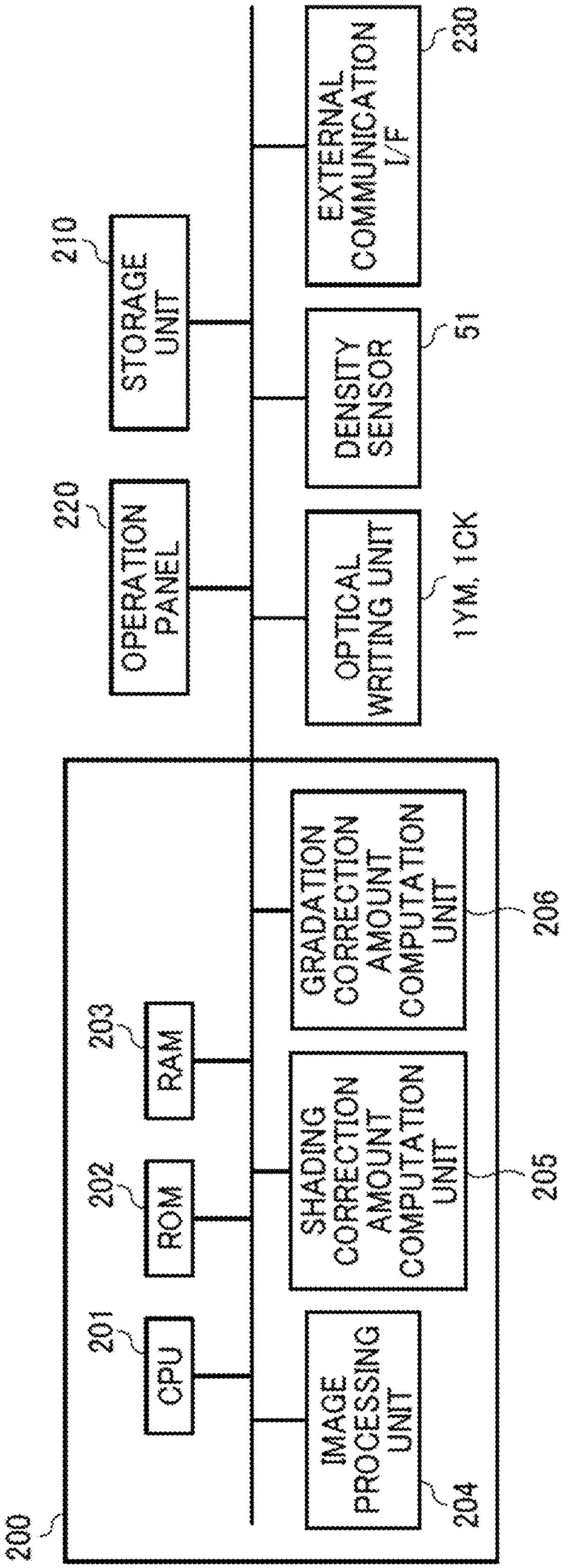
FIG. 9 is a control block diagram of density adjustment control in the main scanning direction, according to an embodiment of the present disclosure.

FIG. 9 is a control block diagram of density adjustment control in the main scanning direction of the present embodiment.

A control unit 200 functioning as a controller and a density corrector includes a central processing unit (CPU) 201, a read-only memory (ROM) 202, a random-access memory (RAM) 203, the image processing unit 204, a shading correction amount computation unit 205, a gradation correction amount computation unit 206, and the like. The optical writing units 1YM and 1CK, the density sensor 51, the operation panel 220, a storage unit 210, an external communication interface (I/F) 230, and the like are coupled to the control unit 200.

The CPU 201 controls operations of the image forming apparatus 1000. Specifically, the CPU 201 uses the RAM 203 as a work area and executes programs stored in the ROM 202 or the like so as to control operations of the entire image forming apparatus 1000 and implement various functions, such as a printer function.

The ROM 202 is a nonvolatile semiconductor memory capable of holding data even when the power is turned off. The RAM 203 is a volatile semiconductor memory that temporarily stores programs and data.

The shading correction amount computation unit 205 computes a shading correction amount based on the data on density unevenness in the main scanning direction detected by the density sensor 51. The computed shading correction amount is stored in the storage unit 210. The gradation correction amount computation unit 206 computes correction amounts for correcting gradations, based on the data on density unevenness in the main scanning direction detected by the density sensor 51. The gradation correction amount computation unit 206 computes a gradation correction amount for each gradation equal to or lower than a prescribed gradation, and creates, based on the gradation correction amounts, a gradation correction table as illustrated in FIG. 15. The created gradation correction table is stored in the storage unit 210. In the present embodiment, the above-described prescribed gradation is a gradation 230.

Figure 17:
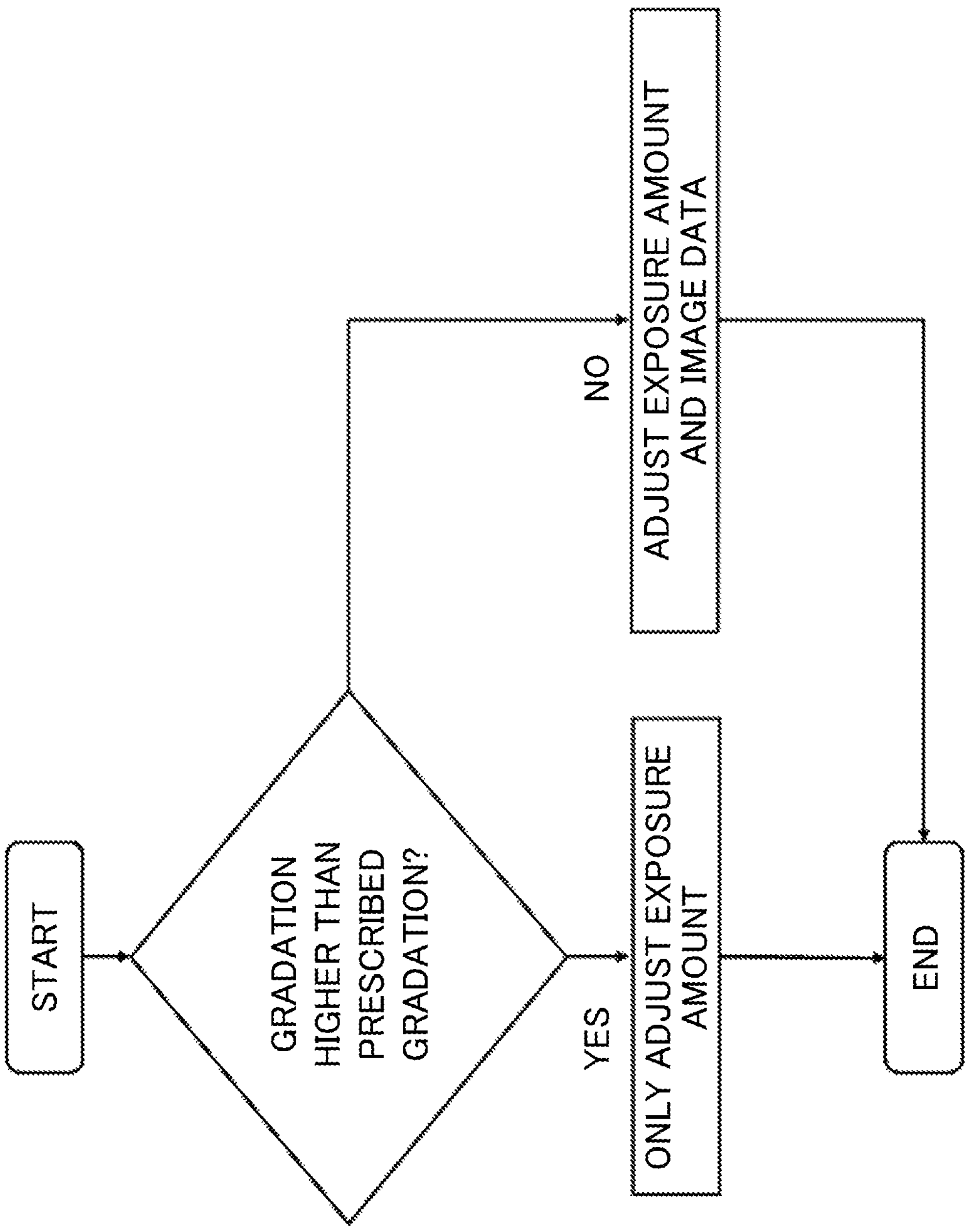
FIG. 17 illustrates a flow chart describing the determination of how to perform a shading correction based on a prescribed gradation.

In the present embodiment, as shown in FIG. 17, only a shading correction is performed for a gradation exceeding the prescribed gradation (gradation 230), and both a shading correction and a gradation correction are performed for a gradation equal to or lower than the prescribed gradation. In the present embodiment, gradations exceeding the gradation 230 are high gradations, and gradations equal to or lower than the gradation 230 are gradations equal to or lower than medium gradations. Note that the prescribed gradation that separates the "high gradations" for which only a shading correction is performed from the gradations equal to or lower than the "medium gradations" for which both a shading correction and a gradation correction are performed may be appropriately set according to characteristics of the apparatus and the like.

The image processing unit 204 performs image processing, such as conversion into a pseudo-gradation image, on image data received from a scanner or a personal computer outside the image forming apparatus 1000 via the external communication I/F 230 to convert the image data into an image that can be written by the optical writing units 1. For an image portion equal to or lower than the prescribed gradation, the image processing unit 204 performs a gradation correction for each area in the main scanning direction based on the gradation correction table stored in the storage unit 210.

The storage unit 210 includes a hard disk drive (HDD), a flash memory, such as a solid-state drive (SSD), and the like, and stores the shading correction amounts and the gradation correction table.

The external communication I/F 230 is an interface for connecting to a network, such as the Internet or a local area network (LAN). The external communication I/F 230 can receive a print instruction, image data, and the like from an external device, such as a scanner or a personal computer.

The operation panel 220 receives various inputs corresponding to a user's operation and displays various types of information (for example, information indicating accepted operation, information indicating the operation status of the image forming apparatus 1000, information indicating the setting state of the apparatus, and the like). For example, the operation panel 220 includes a liquid crystal display (LCD) functioning as a touch panel, but is not limited to the LCD. For another example, the operation panel 220 may include an organic electroluminescence (EL) display functioning as a touch panel. In addition to or instead of the above-described operation panel 220, an operation device, such as a hardware key, or a display device, such as a lamp, may be provided.

Figure 10:
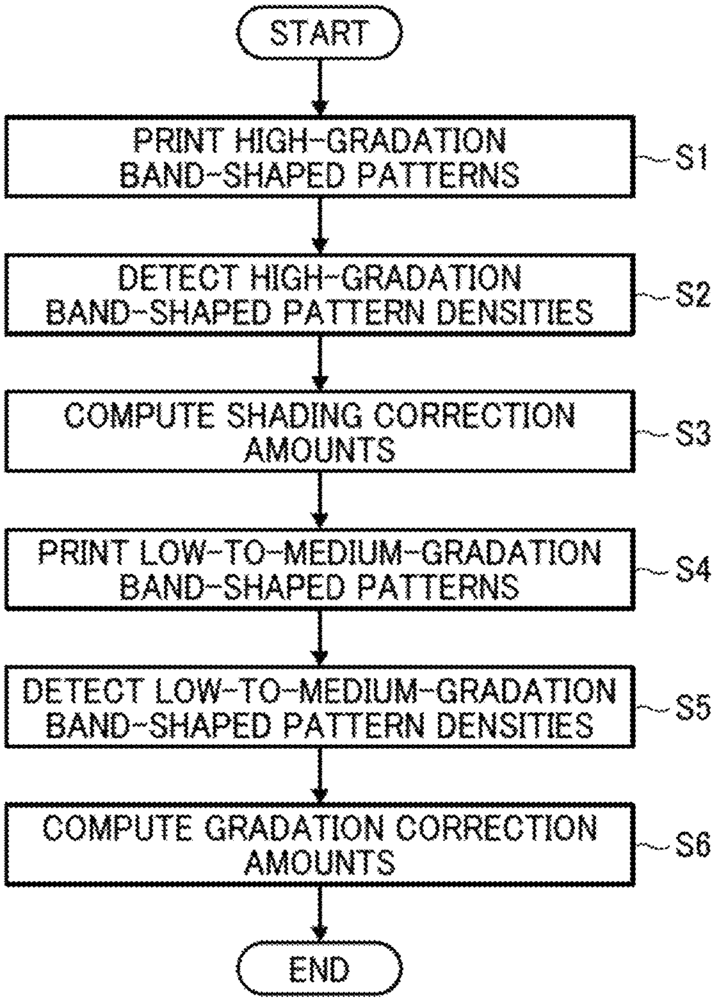
FIG. 10 is a flowchart of the density adjustment control in the main scanning direction, according to an embodiment of the present disclosure.

FIG. 10 is a flowchart of density adjustment control in the main scanning direction of the present embodiment.

A user operates the operation panel 220 to execute the density adjustment control in the main scanning direction. Alternatively, the density adjustment control in the main scanning direction may be automatically executed at a time when the power of the apparatus is turned on, or may be automatically executed for every prescribed number of printed sheets.

When the density adjustment control in the main scanning direction is executed, first, the control unit 200 performs a shading correction. Specifically, first, Y, M, C, and K high-gradation band-shaped patterns are printed on a recording sheet P (S1).

Figure 11:
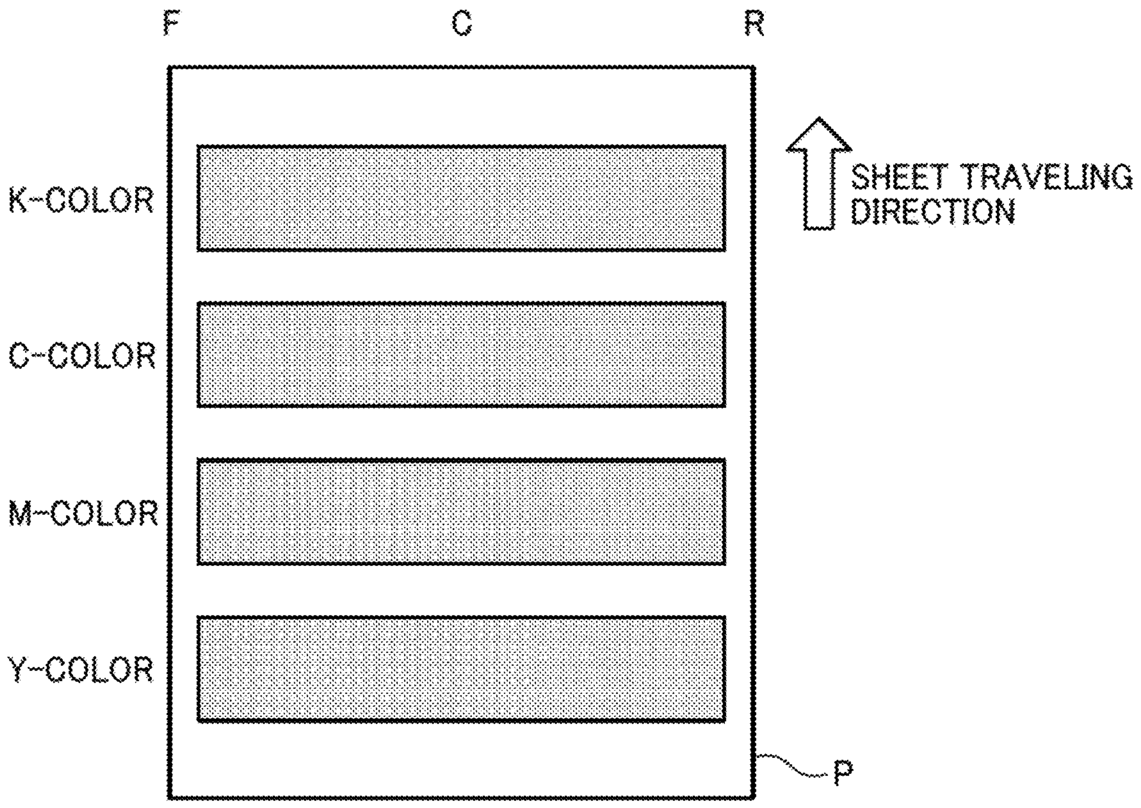
FIG. 11 is a diagram illustrating an example of high-gradation band-shaped patterns formed on a recording sheet.

FIG. 11 illustrates an example of the Y, M, C, and K high-gradation band-shaped patterns formed on a recording sheet P. The gradation of the high-gradation band-shaped pattern is a gradation exceeding the above-described prescribed gradation (gradation 230), and is set to, for example, an image density of a substantially central gradation (gradation 243) between the gradation 230 and a gradation 255. "R" in FIG. 11 indicates the apparatus rear side, "C" in the drawing indicates the center, and "F" in the drawing indicates the apparatus front side. The apparatus front side is the side on which a user operates the operation panel 220.

The image density at each main-scanning direction position of the Y, M, C, and K high-gradation band-shaped patterns formed on the recording sheet P is detected by the density sensor 51, and the density unevenness in the main scanning direction is acquired (S2).

Next, based on the acquired density unevenness in the main scanning direction, the shading correction amount computation unit 205 of the control unit 200 computes a shading correction amount for correcting the laser light amount of each of the optical writing units 1YM and 1CK (S3). Specifically, based on the density unevenness, in the main scanning direction, of the Y-color high-gradation band-shaped pattern, computed is a shading correction amount for correcting the laser light amount of a laser diode that corresponds to the Y color and irradiates the photoconductor 3Y of the optical writing unit 1YM with the laser light. Similarly, based on the density unevenness, in the main scanning direction, of the M-color high-gradation band-shaped pattern, computed is a shading correction amount for correcting the laser light amount of a laser diode that corresponds to the M color of the optical writing unit 1YM. Based on the density unevenness, in the main scanning direction, of the C-color high-gradation band-shaped pattern, computed is a shading correction amount for correcting the laser light amount of a laser diode that corresponds to the C color of the optical writing unit 1CK. Based on the density unevenness, in the main scanning direction, of the K-color high-gradation band-shaped pattern, computed is a shading correction amount for correcting the laser light amount of a laser diode that corresponds to the K color of the optical writing unit 1CK.

The computed shading correction amount of each color is stored in the storage unit 210. At a time of printing, the shading correction amount of each color is read from the storage unit 210, and latent images are formed on the photoconductors with the laser light amounts corrected with the shading correction amounts.

Figure 12:
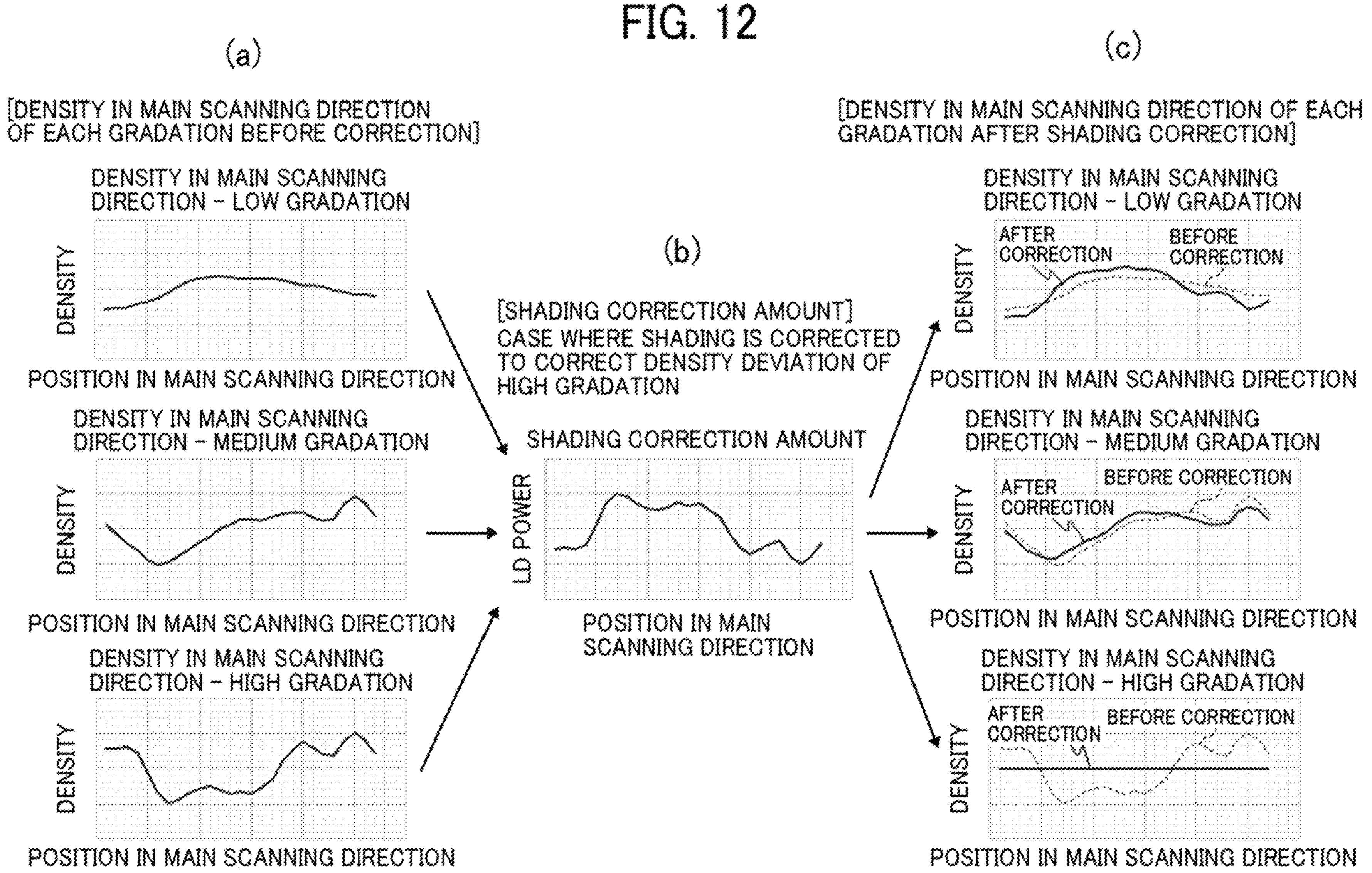
FIG. 12 illustrates graphs of a shading correction according to an embodiment of the present disclosure.

Parts (a), (b), and (c) of FIG. 12 are graphs of a shading correction of the present embodiment.

In the present embodiment, a high-gradation band-shaped pattern is created to perform a shading correction. Therefore, a shading correction amount illustrated in part (b) of FIG. 12 and computed by the shading correction amount computation unit 205 corresponds to high-gradation density unevenness in the main scanning direction. Therefore, as illustrated in part (c) of FIG. 12, when a low-gradation image portion, a medium-gradation image portion, and a high-gradation image portion are printed with the shading correction amount applied, the density unevenness in the main scanning direction disappears only for the high-gradation image portion.

On the other hand, even when the shading correction amount is applied to the low-gradation image portion and the medium-gradation image portion, density unevenness in the main scanning direction remains as indicated by solid lines in part (c) of FIG. 12. Therefore, in order to improve the density unevenness in the main scanning direction for the low to medium gradations, a gradation correction as a correction to image data is performed. Specifically, as illustrated in FIG. 10, after the shading correction is performed (S1 to S3), for each of Y, M, C, and K, a plurality of band-shaped patterns equal to or lower than the prescribed gradation (gradation 230) and having different gradation numbers is printed on a recording sheet P (S4). The plurality of band-shaped patterns of each color is formed by correcting the laser light amount with the shading correction amount computed by the shading correction.

Figure 13:
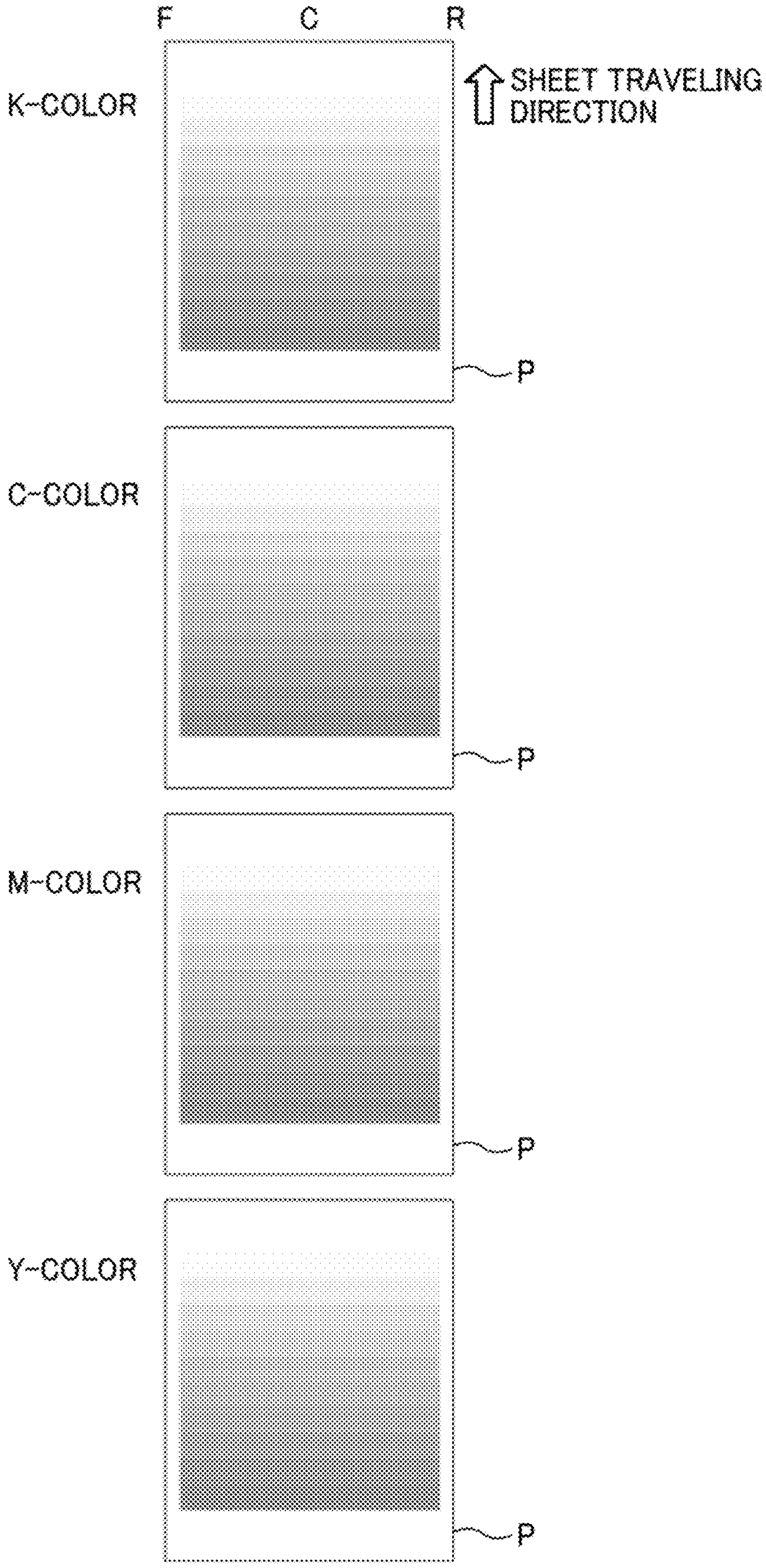
FIG. 13 is a diagram illustrating an example of band-shaped patterns for image data correction.

FIG. 13 is a diagram illustrating an example of band-shaped patterns for image data correction.

In the present embodiment, band-shaped patterns of one color are printed on one recording sheet P. In the present embodiment, 11 band-shaped patterns having different gradation numbers are formed on one recording sheet P. The plurality of band-shaped patterns is formed such that the gradation number is increased in increments of 20 from the downstream side of the recording sheet traveling direction. In the present embodiment, for one of the colors, printed are band-shaped patterns of a gradation 20, a gradation 40, a gradation 60, a gradation 80, a gradation 100, a gradation 120, a gradation 140, a gradation 160, a gradation 180, a gradation 200, and a gradation 220. The number of band-shaped patterns formed on one recording sheet and a gradation number of each band-shaped pattern may be appropriately set.

The image density at each main-scanning direction position of the plurality of Y, M, C, and K color band-shaped patterns formed on the four recording sheets P is detected by the density sensor 51, and density unevenness, in the main scanning direction, of the plurality of gradations is acquired for each color (S4).

In the present embodiment, acquired is the density unevenness, in the main scanning direction, of a total of the eleven gradations of the gradation 20, the gradation 40, the gradation 60, the gradation 80, the gradation 100, the gradation 120, the gradation 140, the gradation 160, the gradation 180, the gradation 200, and the gradation 220.

Next, based on the acquired density unevenness, in the main scanning direction, of the eleven gradations, the gradation correction amount computation unit 206 of the control unit 200 computes a gradation correction amount for each gradation equal to or lower than the prescribed gradation (gradation 230) (S6).

Figure 14:
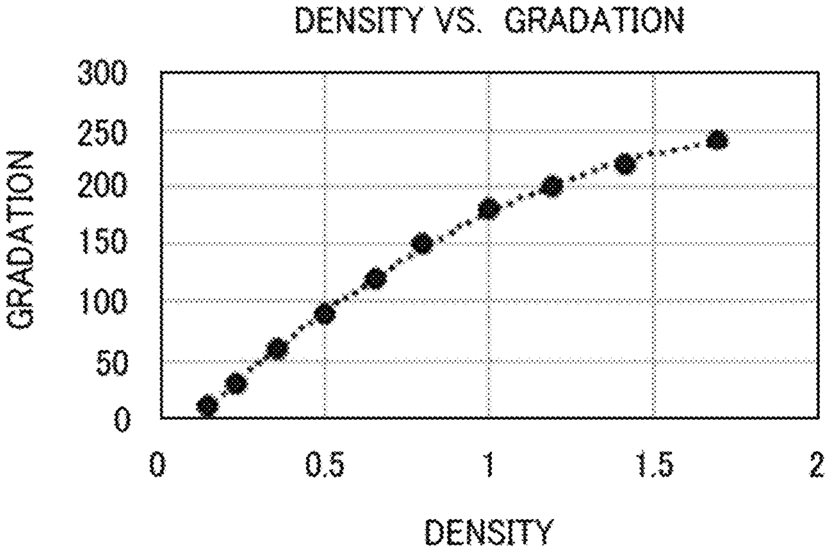
FIG. 14 is a graph illustrating a correlation between image density and gradation.

As an example of the computation of the gradation correction amount, first, the gradation correction amount computation unit 206 computes the average image density of each gradation from the density unevenness, in the main scanning direction, of the eleven gradations. Computing the average image density of each gradation obtains the correlation between the gradation and the image density as illustrated in FIG. 14. Specifically, the correlation between the gradation and the image density is represented by a cubic approximation. The cubic approximation is differentiated to obtain a gradation number per image density at a predetermined density. The above-described cubic approximation indicating the correlation between the gradation and the image density may be obtained in advance by an experiment or the like and stored in the storage unit 210.

Next, from the correlation illustrated in FIG. 14, an image density corresponding to the gradation of each band-shaped pattern is obtained, and the image density is used as the reference to compute the density difference value of each area in the main scanning direction, from the density unevenness, in the main scanning direction, of each band-shaped pattern. A necessary gradation correction amount is obtained from the density difference value, and a gradation number per image density in the image density corresponding to a gradation obtained by differentiating a cubic approximation indicating the correlation between the gradation and the image density. That is, a gradation correction amount that gets rid of the difference between a target gradation and an actual gradation of each area in the main scanning direction is computed. Such a calculation is performed because the gradation and the density do not have a linear approximation correlation, and a gradation correction amount required per unit of density varies depending on image density.

Next, a gradation correction amount of each area in the main scanning direction is obtained for each gradation of the band-shaped pattern, and then a gradation correction amount of each area, in the main scanning direction, of gradations between the band-shaped patterns is obtained by an interpolation calculation. Note that a gradation correction amount of each area in the main scanning direction may be obtained for gradations between the band-shaped patterns, as described below. That is, based on the density unevenness, in the main scanning direction, of the plurality of band-shaped patterns, the density unevenness, in the main scanning direction, of gradations between the band-shaped patterns is calculated by an interpolation calculation. Then, based on the calculated density unevenness, in the main scanning direction, of the gradations between the band-shaped patterns, a gradation correction amount of each area in the main scanning direction of each gradation between the band-shaped patterns is obtained.

In this way, a gradation correction amount of each area in the main scanning direction is obtained for gradations 0 to 230. Then from the gradation correction amount of each area in the main scanning direction, a target gradation number of each area in the main scanning direction in each gradation is obtained, and a gradation correction table as illustrated in FIG. 15 is created. The created gradation correction table is stored in the storage unit 210. Instead of the target gradation number of each area in the main scanning direction in each gradation, a gradation correction amount of each area in the main scanning direction in each gradation may be possible.

In this way, when the gradation correction table is stored in the storage unit 210, the density adjustment control in the main scanning direction ends.

The image processing unit 204 performs a gradation correction based on the gradation correction table in FIG. 15 stored in the storage unit 210. For example, from a gradation number of an area, in the main scanning direction, of image data, and the gradation correction table, the image processing unit 204 acquires a target gradation number in the area. Then, the image processing unit 204 corrects the image data into the target gradation numbers. For example, when a target gradation number is higher than a gradation number of image data, a predetermined number of white dots are converted into color dots in a dot pattern illustrated in FIG. 7 representing a gradation (image shading) so as to obtain the target gradation number to correct the image data to perform a gradation correction. On the other hand, when a target gradation number is lower than a gradation number of image data, a predetermined number of color dots are converted into white dots in a dot pattern illustrated in FIG. 7 representing a gradation (image shading) so as to obtain the target gradation number to correct the image data to perform a gradation correction.

Figure 16:
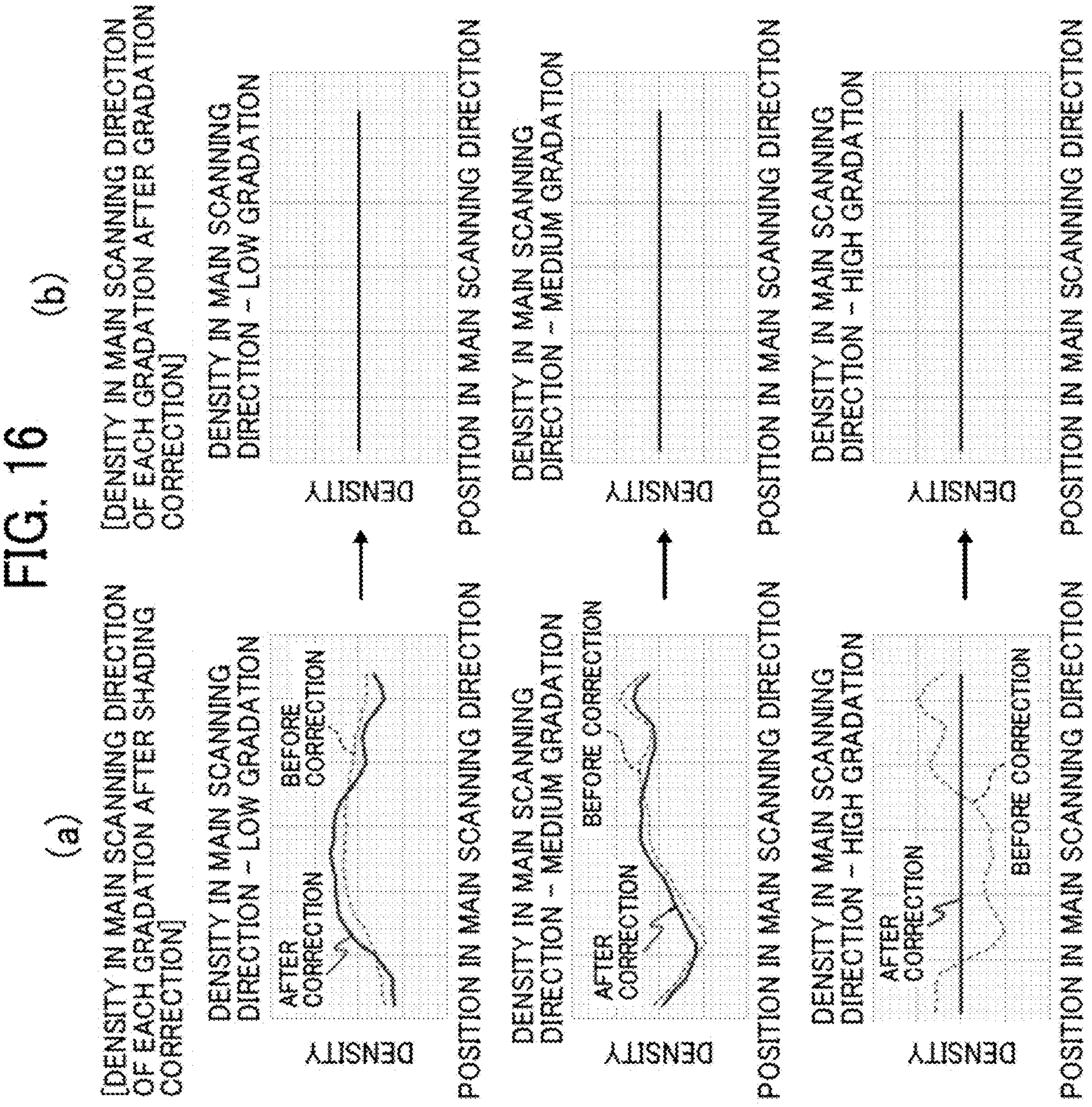
FIG. 16 illustrates graphs of a gradation correction according to an embodiment of the present disclosure.

Parts (a) and (b) of FIG. 16 are graphs of a gradation correction of the present embodiment.

As illustrated in part (a) of FIG. 16, in the present embodiment, for a high-gradation image portion (exceeding the gradation 230), performing a shading correction can favorably reduce the density unevenness in the main scanning direction. However, for low gradations and medium gradations, the density unevenness in the main scanning direction remains. However, for gradations 0 to 230, performing the above-described gradation correction can reduce density unevenness, in the main scanning direction, of all the gradations of low gradations, medium gradations, and high gradations, as illustrated in part (b) of FIG. 16.

In the present embodiment, the shading correction is performed for all the gradations. As a result, it is not necessary to determine whether or not to perform the shading correction according to the gradation number of an image portion, and the control of the optical writing units 1 can be simplified.

In the above description, a gradation correction is not performed for a high-gradation image exceeding 230, but a gradation correction may be performed for all gradations. Consequently, for high gradations, density unevenness in the main scanning direction which is not totally corrected by a shading correction can be corrected by the gradation correction. Note that for the high gradations, the variation range of the density unevenness is reduced by the shading correction. Therefore, even if the number of white dots is small and the number of dots that can be converted into color dots is small, a gradation correction can be performed so that an area in the main scanning direction having a density lower than the reference obtains the reference image density.

The configurations according to the above-descried embodiments are examples, and embodiments of the present disclosure are not limited to the above-described examples. For example, the following aspects can achieve effects described below.

First Aspect

Included are a latent image bearer, such as the photoconductors 3, an exposure device, such as the optical writing units 1, that exposes the latent image bearer to form a latent image based on image data, and a detector, such as the density sensor 51, that detects the density unevenness, in the main scanning direction, of a toner image obtained by developing the latent image. Based on the density unevenness in the main scanning direction detected by the detector, an exposure amount, such as a laser light amount, of the exposure device and the image data are corrected.

Consequently, for a gradation whose density unevenness in the main scanning direction remains despite a correction to the exposure amount of the exposure device, correcting the image data can reduce the density unevenness in the main scanning direction. Therefore, the density unevenness in the main scanning direction can be favorably reduced for all the gradations.

Second Aspect

In the first aspect, only the exposure amount is corrected based on the density unevenness to form an image portion with a high gradation (in the present embodiment, a gradation higher than the gradation 230), and the exposure amount and the image data are corrected based on the density unevenness to form an image portion with a gradation except the high gradation, that is, a gradation lower than the high gradation.

Consequently, as in the above-described embodiment, a good image in which the density unevenness in the main scanning direction is reduced can be obtained.

Third Aspect

In the second aspect, exposure amount correction data, such as a shading correction amount, for correcting the exposure amount, such as a laser light amount, of the exposure device is acquired based on density unevenness, in the main scanning direction, of a high-gradation toner image with a higher gradation than a prescribed gradation, such as a high-gradation band-shaped pattern, detected by the detector, such as the density sensor 51, and image correction data, such as a gradation correction amount, for correcting the image data based on density unevenness, in the main scanning direction, of a toner image with a gradation equal to or lower than the prescribed gradation obtained using the exposure amount corrected with the exposure amount correction data is acquired.

Consequently, as in the above-described embodiment, correcting the exposure amount, such as a laser light amount, based on the acquired exposure amount correction data, such as an acquired shading correction amount, can favorably reduce the density unevenness, in the main scanning direction, of a high-gradation image portion with a higher gradation than a prescribed gradation. In addition, correcting an image portion with a gradation equal to or lower than the prescribed gradation of the image data based on the acquired image correction data, such as an acquired gradation correction amount, can also reduce the density unevenness, in the main scanning direction, of the image portion with the gradation equal to or lower than the prescribed gradation. Consequently, a good image in which the density unevenness in the main scanning direction is reduced can be obtained over all the gradations.

Fourth Aspect

In any one of the first to third aspects, a dot pattern of a pixel including a plurality of dots is set according to a gradation.

Consequently, the shading of image density of a pixel can be expressed by the dot pattern, and the gradation can be expressed.

Fifth Aspect

In the fourth aspect, the correction to the image data based on the density unevenness is a correction to the dot pattern.

Consequently, since as described in the fourth aspect, the shading of image density of a pixel can be expressed by the dot pattern, correcting the dot pattern based on the density unevenness can correct the density unevenness in the main scanning direction.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus comprising:

a latent image bearer;

an exposure device configured to expose the latent image bearer to form a latent image based on image data;

a detector configured to detect density unevenness, in a main scanning direction, of a toner image obtained by developing the latent image; and processing circuitry configured to correct only an exposure amount of the exposure device based on the density unevenness to form an image portion with a higher gradation than a prescribed gradation, the processing circuitry further configured to correct the exposure amount and the image data based on the density unevenness in the main scanning direction detected by the detector to form an image portion with a gradation equal to or lower than the prescribed gradation.

2. The image forming apparatus according to claim 1, wherein the processing circuitry is configured to:

acquire exposure amount correction data for correcting the exposure amount of the exposure device based on density unevenness, in the main scanning direction, of a high-gradation toner image detected by the detector, the high-gradation toner image having a higher gradation than the prescribed gradation, and acquire image correction data for correcting the image data based on density unevenness, in the main scanning direction, of a toner image with a gradation equal to or lower than the prescribed gradation obtained using the exposure amount corrected with the exposure amount correction data.

3. The image forming apparatus according to claim 1, wherein the processing circuitry is configured to set a dot pattern of a pixel including a plurality of dots according to a gradation.

4. The image forming apparatus according to claim 3, wherein the processing circuitry is configured to correct the dot pattern in correcting the image data based on the density unevenness.

5. The image forming apparatus according to claim 4, wherein the correcting of the dot pattern comprises changing at least one dot of the plurality of dots from white to color, or wherein the correcting of the dot pattern comprises changing at least one dot of the plurality of dots from color to white.

* * * * *